Nov. 10, 1959 P. B. SHAFFER 2,912,290
ASSEMBLY AND METHOD FOR DETERMINING
THE END PLAY OF A ROTATABLE SHAFT
Filed April 30, 1957
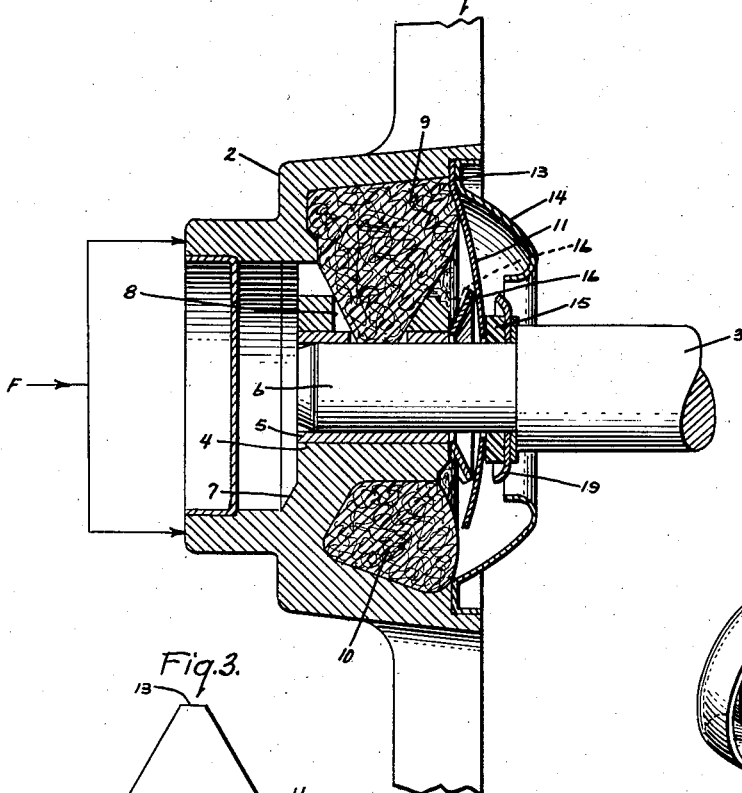
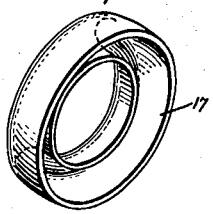
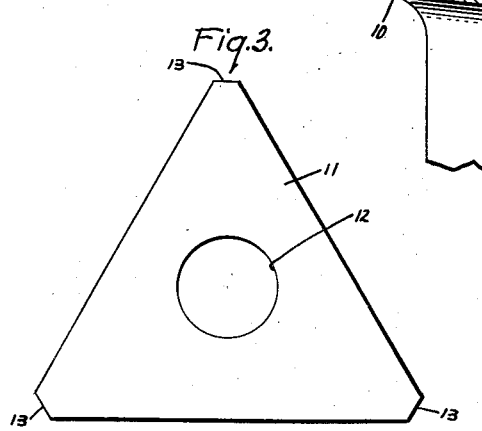
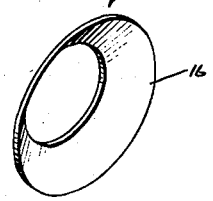
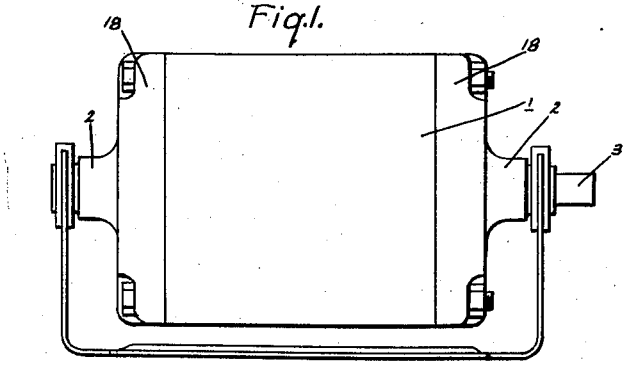
Inventor:
Paul B. Shaffer,
by Robert G. Irish
His Attorney.

United States Patent Office 2,912,290
Patented Nov. 10, 1959

2,912,290

ASSEMBLY AND METHOD FOR DETERMINING THE END PLAY OF A ROTATABLE SHAFT

Paul B. Shaffer, De Kalb, Ill., assignor to General Electric Company, a corporation of New York Application April 30, 1957, Serial No. 656,134

4 Claims. (Cl. 308—163)

This invention relates to apparatus having rotatable parts, and more particularly to an assembly and a method for determining the amount of axial freedom, or "end play" of such parts.

In equipment which is driven by rotatable machines such as, for instance, electric motors, it is frequently necessary that the axial positioning of the rotatable driving shaft be precise, with a very limited amount of axial freedom. Such axial freedom, or "end play" as it is called, may have a pronounced effect on the operation of the device being driven. For instance, where an electric motor drives a part which rotates within a seal intended to keep fluid out, leakage through the seal is pronouncedly affected by the amount of end play of the shaft.

Accordingly, it is important to maintain the end play of the rotatable driving part, such as the motor shaft, to an absolute minimum. However, it is an established fact that the smaller the manufacturing tolerances allowed, the greater is the expense involved in the manufacture. Consequently, in the past, the cost of machines has risen substantially where little end play could be tolerated.

It is, consequently, an object of this invention to provide an improved assembly which restricts the end play of a rotatable shaft to a substantial extent without any undue increase in the cost of manufacture.

A further object of the invention is to provide end play controlling structure involving a minimum of addition over the structure normally used in thrust bearing arrangements.

Yet a further object of the invention is to provide an improved method of assembling the structure into a bearing construction so as to achieve the desired control over the end play.

In one aspect thereof, the invention provides, in a bearing assembly for a rotatably mounted shaft having a thrust surface, a resilient thrust bearing member which is adapted to be placed in thrust receiving relation to the shaft surface. A rigidly mounted substantially inflexible part is axially spaced from the thrust bearing member, and an intermediate member is positioned between the rigidly mounted part and the thrust bearing member; the intermediate member is formed to bias the thrust member a predetermined axial distance away from the rigidly mounted member toward the shaft thrust surface so as to determine the end play of the shaft. The intermediate member has a composition and a shape such that it is substantially rigid at the maximum level of stress which is encountered as a result of shaft thrust, but will take a permanent set at a level of stress substantially higher than the above mentioned maximum level.

This end play is easily and effectively achieved by shaping the intermediate member, when it is assembled between the thrust bearing member and the rigidly mounted part, to fill the space between them so as to bias the thrust bearing member against the shaft thrust surface, and then subjecting the intermediate member to an axial compressive stress at which it is flexible until it is permanently flattened out the desired amount. With an intermediate member of a known material and shape, it is possible to calculate in advance the amount of stress which must be exerted for a predetermined and relatively small amount of end play. The stress may then be exerted on the intermediate member in the regular course of assembly either by a steady force (such as a tightening of bolts) or by impact, with the latter generally proving to be more satisfactory for production line operations.

The features of the invention which are believed to be novel are set forth with particularity in the appended claims. The invention itself, however, together with further objects and advantages thereof may best be understood by reference to the following description taken in connection with the accompanying drawing.

In the drawing,

Figure 1 is a plan view of an electric motor;

Figure 2 is an enlarged fragmentary view in cross section showing the improved bearing construction utilized in the motor of Figure 1;

Figure 3 is an end view of the resilient thrust bearing member which is included in the structure shown in Figure 2;

Figure 4 is a view in perspective of the end play controlling member of Figure 2; and Figure 5 is a view in perspective of a modified end play controlling member.

Referring now to Figures 1 to 4 of the drawing, there is shown an electric motor, generally indicated at 1, having a pair of end shields 18 with bearing housings 2 respectively formed therein to support a shaft 3. Shaft 3 may be rotatably supported in the usual manner by a bearing 4 having a suitable bearing surface 5 in sliding contact with portion 6 of the shaft; bearing 4 is supported by housing 2 through the usual medium of an inwardly extending spider 7. An opening 8 is formed in bearing 4, and a mass of lubricant-impregnated wicking 9 fills the space between the housing 2 and the bearing 4 and extends through opening 8 into contact with shaft portion 6 so as to effect proper lubrication of the bearing. Wicking 9 is retained within the cavity 10 by a triangular member 11—generally substantially flat when in an unbiased condition—which is provided with an opening 12 for shaft portion 6 and which has apices 13 secured within housing 2 through the medium of a retainer member 14, as shown. Member 11 is formed of resilient material, and has its inner portion adjacent the shaft arranged in thrust bearing relationship with the surface of a washer 15 which is rotatably mounted on shaft portion 6 against a washer 19 which is secured to the shaft so as to rotate therewith. Washers 15 and 19 are, in effect, one way of providing a thrust surface for shaft 3, and it will be understood that other suitable thrust surface arrangements may be provided without affecting the invention as it is to be described.

In order to limit the amount of end play of shaft 3, there is provided an annular member 16 which, in the illustrated embodiment, has the general appearance of a Belleville washer. Member 16 is selected to have a composition and shape so that it (1) is substantially rigid at the maximum level of stress which is encountered as a result of axial thrust forces acting on shaft 3 to the left as viewed in Figure 2 and (2) takes a permanent set at a level of stress which is substantially higher than the above mentioned maximum level. In order for the desired rigidity to be provided at the lower level of stress and the desired flexibility to be provided at the higher level, member 16 should be composed of a metal having an elastic limit which is (1) great enough so that it is not exceeded by maximum thrust forces exerted during the ordinary application of the motor 1, and (2) low enough so that during the assembly an axial force in excess of the elastic limit can be exerted on member 16 so as to effect a permanent deformation of member 16 in that it becomes flattened out to a degree depending upon the amount of force exerted. One material which has been used with good effects and which has the required elastic limit feature is soft steel. Other specific examples of suitable materials, among the many which exist, are soft brass, and aluminum.

In order to effect the desired goal, the bearing assembly is arranged with member 16 located between the end of bearing 4, which acts as an unyielding rigidly mounted part for this purpose, and the thrust bearing member 11, which is thus forced to a biased position against washer 15. The dimensions and shape of part 16 are such that when it is assembled, it fills an axial space between the bearing 4 and the thrust bearing member 11 equal to the largest previous end play distance between member 11 and washer 15 and annular member 16 is therefore held stationary between rigidly mounted bearing 4 and thrust member 11 relative to the rotatable shaft 3. At this point, a force F is exerted on the bearing housing 2 while the shaft 3—and washers 15 and 19—are secured rigidly in place by any desired means such as, for instance by securing the bearing housing 2 at the other end of the shaft. This transmits through the bearing 4 an axial stress on member 16 due to deflection of end shield 18. This stress, through suitable control of the force F, is caused to be greater than the elastic limit so as to effect permanent deformation of part 16. Depending upon the amount of force thus exerted, member 16 is flattened out to approximately the shape shown in dotted outline, and the resilience of member 11 causes it to flatten out to the same extent to remain in contact with member 16. With predetermined knowledge of the shape and material of member 16, and the stress-strain relation of the end shield 18, it is a simple matter to calculate the force required to effect a given free end play since the amount of end play will be that amount of axial space which exists between member 11 and thrust washer member 15 after the axial length of member 16 has been reduced.

As a practical example of the foregoing, a member having the shape shown at 16, and formed of soft steel .010 inch thick was assembled in a bearing construction as shown in Figure 2, and was then subjected to a force F of 1000 pounds. Soft steel has an elastic limit of approximately 20,000 pounds per square inch. The force of 1000 pounds created a stress in the material substantially in excess of the elastic limit, and decreased its axial length by approximately 10 thousandths of an inch. Since this amount represents the end play left available to the shaft 3, it was thus possible to simply and quickly provide an end play of small magnitude for shaft 3.

Referring now to Figure 5, there is shown a member 17 which also has a shape very well suited to its use as an end play controlling part to be located between a bearing 4 and a thrust bearing member 11. It will be obvious that the end play controlling member may assume shapes other than the two specific shapes described and shown above and that suitable materials other than those enumerated above may also be utilized in the composition of the end play controlling member. Therefore, while the invention has been explained by describing particular embodiments thereof, it will be apparent that improvements and modifications may be made without departing from the scope of the invention as defined in the appended claims.

What I claim as new and desire to secure by Letters Patent of the United States is:

1. In a bearing assembly, a rotatable shaft having a thrust surface, a stationary normally flat resilient thrust bearing member in thrust receiving relation to said shaft surface, a rigidly mounted substantially inflexible part axially spaced from said thrust bearing member, and an intermediate member arranged between said rigidly mounted part and said thrust bearing member and held stationary therebetween relative to said rotatable shaft, said intermediate member forcing said thrust bearing member toward said shaft surface to define a predetermined end play therewith, said intermediate member having a composition and shape so that it (1) is substantially rigid at the maximum level of stress encountered as a result of shaft thrust and (2) takes a permanent set at a level of stress substantially higher than said maximum level.

2. In a bearing assembly, a rotatable shaft having a thrust surface, a rigidly mounted radial bearing rotatably supporting said shaft, a stationary normally flat resilient thrust bearing member axially spaced from the end of radial bearing in thrust receiving relation to said shaft surface, and an intermediate member arranged between the end of said radial bearing and said thrust bearing member and held stationary therebetween relative to said rotatable shaft, said intermediate member forcing said thrust bearing member toward said shaft surface to define a predetermined end play therewith, said intermediate member having a composition and shape so that it (1) is substantially rigid at the maximum level of stress encountered as a result of shaft thrust and (2) takes a permanent set at a level of stress substantially higher than said maximum level.

3. In a bearing assembly for a rotatable shaft having a thrust surface where said assembly includes a resilient thrust bearing member adapted to be in thrust receiving relation to said shaft surface and a rigidly mounted substantially inflexible part axially spaced from said thrust bearing member, a method of determining the amount of end play of the shaft which comprises the steps of arranging between said thrust bearing member and said rigidly mounted part an intermediate member having a composition and shape so that it (1) is substantially rigid at the maximum level of stress encountered as a result of shaft thrust and (2) takes a permanent set at a level of stress substantially higher than said maximum level, said intermediate member being formed normally to extend the full axial distance between said thrust bearing member and said rigidly mounted part so as to force said thrust bearing member away from said rigidly mounted part substantially into engagement with said thrust surface, and subjecting said intermediate member to an axial compressive stress substantially higher than said maximum level until said intermediate member is axially shortened a predetermined amount to provide a predetermined end play between said thrust bearing member and said thrust surface.

4. In a bearing assembly, a rotatable shaft having a thrust surface, a rigidly mounted radial bearing rotatably supporting said shaft, a normally flat resilient thrust bearing member axially spaced from the end of said radial bearing in thrust receiving relation to said shaft surface, and an annular intermediate member having a central portion with an opening formed therein arranged about said shaft between the end of said radial bearing and said thrust bearing member and having an outer portion forcing said thrust bearing member toward said shaft surface to define a predetermined end play therewith, said intermediate member being formed of a metal having an elastic limit at least as great as the maximum level of stress encountered as a result of shaft thrust and which takes a permanent set at stresses above the elastic limit.

References Cited in the file of this patent

UNITED STATES PATENTS

| | | |
|---|---|---|
| 2,078,783 | Welch | Apr. 27, 1937 |
| 2,101,130 | Christman | Dec. 7, 1937 |